(12) United States Patent
Braun

(10) Patent No.: US 7,265,778 B2
(45) Date of Patent: Sep. 4, 2007

(54) VISUAL DISPLAY CHARACTERIZATION

(75) Inventor: Gustav Braun, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 649 days.

(21) Appl. No.: 10/364,486

(22) Filed: Feb. 11, 2003

(65) Prior Publication Data

US 2003/0125566 A1 Jul. 3, 2003

Related U.S. Application Data

(63) Continuation-in-part of application No. 09/925,996, filed on Aug. 9, 2001, now abandoned.

(51) Int. Cl.
*H04N 17/00* (2006.01)
*H04N 17/02* (2006.01)

(52) U.S. Cl. .................. 348/184; 348/191; 348/708

(58) Field of Classification Search ............ 348/184, 348/659–661, 189, 191, 569; 345/690; 382/100, 382/162, 167
See application file for complete search history.

(56) References Cited

U.S. PATENT DOCUMENTS

| | | | |
|---|---|---|---|
| 5,363,197 A | * | 11/1994 | Ohno et al. ............... 356/405 |
| 5,638,117 A | | 6/1997 | Engeldrum et al. |
| 5,754,222 A | | 5/1998 | Daly et al. |
| 6,023,264 A | | 2/2000 | Gentile et al. |
| 6,078,309 A | * | 6/2000 | Chen et al. ............... 345/589 |
| 6,124,936 A | * | 9/2000 | Okamoto .................. 356/406 |
| 6,734,869 B2 | * | 5/2004 | Murashita et al. ......... 345/589 |

OTHER PUBLICATIONS

Berns et al., CRT Colorimetry, vol. 18, No. 5, Oct. 1993, pp. 299-314.
Cowan, An Inexpensive Scheme for Calibration of a Colour Monitor in Terms of CIE Standard Coordinates, *Computer Graphics*, vol. 17, No. 3, Jul. 1983, pp. 315-321.
U.S. Appl. No. 09/809,398, filed by Yang et al., May 15, 2001.

* cited by examiner

*Primary Examiner*—Trang U. Tran
(74) *Attorney, Agent, or Firm*—Robert L. Walker

(57) ABSTRACT

A method of characterizing a display having a plurality of color channels includes the steps of visually characterizing the nonlinearities of the display; determining luminance ratios of the color channels using heterochromatic photometry; determining the chromaticities of the color channels using a neutral identification process; and calculating a colorimetric mixing matrix for the display by combining the luminance ratios of the color channels with the chromaticities of the color channels.

20 Claims, 4 Drawing Sheets

VISUAL DISPLAY CHARACTERIZATION

CROSS REFERENCE TO RELATED APPLICATIONS

This is a continuation-in-part of U.S. Ser. No. 09/925,996, filed Aug. 9, 2001 now abandoned by Gustav Braun, entitled Display Characterization Using Heterochromatic Photometry.

FIELD OF THE INVENTION

This invention relates to the visual characterization of a display and more particularly of a display without the use of characterization hardware.

BACKGROUND OF THE INVENTION

U.S. Pat. No. 5,754,222 issued May, 1998 to Daly et al., which is incorporated herein by reference, discloses a method for visually calibrating a display by performing a visual offset estimation; determining a display gamma using a spatially modulated target; and determining an additive colorimetric mixing matrix using a neutral identification process. The step of determining the colorimetric mixing matrix relies on the visual identification of a neutral. In addition, their approach relies on the viewer to specify the chromaticities of the display or that these data will be supplied by some other source. Their process teaches an approach where the chromaticities of the display are entered by the user or selected from a list. For many applications this is neither practical nor possible.

Another approach to characterizing a display is shown in U.S. Pat. No. 6,023,264 issued Feb. 8, 2000 to Gentile et al. who employ a different stimulus presentation technique from that of Daly et al. (U.S. Pat. No. 5,754,222), but the step of determining a colorimetric mixing matrix also relies on the visual identification of neutral. The Gentile et al. approach (U.S. Pat. No. 6,023,264) does not provide an approach for visually determining the chromaticities of the display. Since these prior art processes rely on the user to either have knowledge of the chromaticities of the display (e.g., from prior calorimetric measurement); assume some set of chromaticities based on the display type entered by the user; or assume some default chromaticity if not available or known by user, these characterizations are fundamentally incomplete.

Another approach to characterizing a display is shown in U.S. Pat. No. 5,638,117 issued Jun. 10, 1997 to Engeldrum et al. where a display patch is adjusted to match a reference card of known colorimetry. This process is very difficult to perform because it requires the viewer to make both luminance and hue adjustment which may or may not be familiar to the viewer. Also, it requires the viewer to obtain and maintain the reference card as well as make decisions regarding the ambient illumination conditions for the environment in which the display is used. This process is too subjective and has the potential for large characterization errors.

Another approach to characterizing a display is given by W. B. Cowan in "An Inexpensive Scheme for Calibration of a Colour Monitor in Terms of CIE Standard Coordinates," Computer Graphics, Vol. 17, No. 3, 1983. This article teaches a process for display calibration that uses a mixture of instrumentation and visually based techniques to calibrate then characterize a CRT display to a know colorimetric state.

In general, the visually based characterization and calibration steps were described as methods for verifying the state of calibration of the display. Cowan's model for a CRT display consists of a nonlinearity and a colorimetric mixing matrix. He describes a simple instrumentation based approach that could be used to determine the nonlinearities of the display and a set of visual checks that could be used to verify that the display's channel nonlinearities remained constant over time. These visual checks utilized spatially or temporally dithered luminance targets that provide a known luminance reference that can be used to verify the calibration of the display. Cowan does not teach a process to completely characterize the display's channel nonlinearities using a visual process, rather he teaches how a visual stimulus could be used to verify the stability of the display's channel nonlinearities over time.

Cowan describes a process for determining the gun normalization factors for a display using a process of heterochromatic flicker photometry or heterochromatic brightness matching. The gun normalization factors Cowan referred to are equivalent to the ratios of the luminances of the display's color channels. In general, Cowan indicates this process is not accurate and should be used as a check of the stability of the luminance ratios over time. Cowan does not teach a process for designing visual tests that make the process of determining the display's channel luminance ratios accurate enough for characterization purposes. Additionally, the process outlined by Cowan does not provide a visually based method for determining the chromaticities of the display's channels. Cowan provides techniques for obtaining the chromaticities of the display ranging from performing spectrophotometric measurements of the display's chromaticities to contacting the manufacture of the display for this information. As such, there is a need for developing a process for visually identifying the chromaticities of a display.

There is a need therefore for an improved method of visually characterizing a display that provides separate mechanisms for determining the channel nonlinearities, channel luminance ratios, and channel chromaticities.

SUMMARY OF THE INVENTION

The need is met according to the present invention by providing a method of characterizing a display having a plurality of color channels that includes the steps of visually characterizing the nonlinearities of the display; determining luminance ratios of the color channels using heterochromatic photometry; determining the chromaticities of the color channels using a neutral identification process; and calculating a calorimetric mixing matrix for the display by combining the luminance ratios of the color channels with the chromaticities of the color channels. As used herein, heterochromatic photometry means either brightness matching photometry or minimum flicker photometry.

ADVANTAGES

The present invention has the advantage that it provides a complete visual calorimetric characterization of a display that does not rely on external props or the users knowledge of the display characteristics. Additionally, the methods of determining the channel nonlinearities and the colorimetric mixing matrix use more objective visual assessments than methods employed in the prior art, thereby resulting in more repeatable and accurate characterization of the display. Also, the present invention provides a visually based process for determining the chromaticities of a display. The prior art processes do not do this without the use of external props or measurement devices.

DETAILED DESCRIPTION OF THE INVENTION

Figure 1:
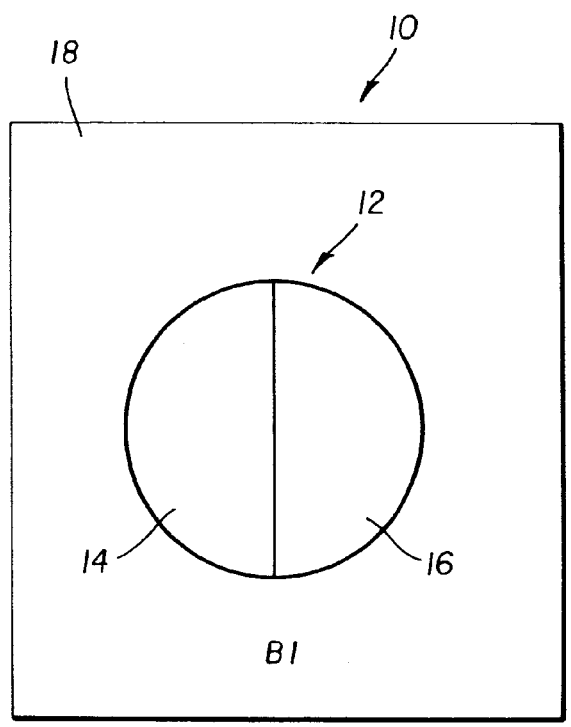
FIG. 1 is a diagram useful in explaining the prior art method of heterochromatic brightness matching.

This invention provides the means to determine the colorimetric mixing matrix of an additive color display device such as a cathode ray tube (CRT) using a series of visual photometric assessments. It is known that a three-channel display device that exhibits additive color mixing properties can be modeled using a 3-by-3 rotation matrix that converts gamma-corrected digital count values to colorimetric quantities such as CIE tristimulus values. See Berns, et al., "CRT Colorimetry. Part 1: Theory and Practice," Color Research and Application, Vol. 18, No. 5, pp. 299-314, 1993. As used herein, gamma-corrected digital count values refer to channel luminance scalars.

The form of the display's calorimetric mixing matrix depends on two factors. The first factor is the spectral power distribution of the display's phosphors (which determines the chromaticities of the phosphors). The second factor is the luminance ratios of the display's channels (which control the white point chromaticities of the display). The present invention provides an all visual process designed to determine the ratios of the channel luminances. Based on these channel luminance ratios and an estimate of the display phosphor chromaticities, an estimate of the calorimetric mixing properties of a display is generated. This colorimetric mixing matrix can be used, in conjunction with an estimate of the display's channel nonlinearities (sometimes referred to as the gammas of the display channels), to generate an ICC profile or some other characterization of the display's calorimetric properties. In one embodiment of the present invention the estimate of the display channel nonlinearities can be performed using the technique shown by Daly et al. (supra).

Estimation of a display's channel nonlinearities using the process disclosed by Daly et al. (supra) consists of visually estimating the parameters in a display nonlinearity equation. These terms are an offset and gamma value. The offset term is estimated by having the viewer select the first visible stimulus from a code value ramp. The device code values (digital counts) associated with this first visible patch represent the offset of the model. The gamma parameter of their model is determined using a target that has a spatially modulated field and a continuous tone field. A series of these targets is generated for assumed values of gamma using the visually estimated offset. The target whose brightness of the spatially modulated field most closely matches the brightness of the continuous tone field corresponds to the correct gamma for the display. One strong feature of their process is in the form of their visual target. The boundary line between the continuous tone field and the spatially modulated field is on an angle. This makes the visual task of matching the two fields much easier than if the interface between the fields was oriented vertically or horizontally, due to the frequency response of the human visual system.

In yet another embodiment of the present invention the process given by Yang et al. in U.S. Ser. No. 09/809,398 filed May 15, 2001, which is incorporated herein by reference, can be used to solve the display's channel nonlinearities. Their process for solving for the display channel nonlinearities uses a flicker photometry process and a nonlinear optimization approach. They create a plurality of temporally dithered stimuli and match the luminance of those stimuli with non-temporally varying patches. They use the data gathered from the matching experiments to estimate the parameters of a display nonlinearity equation using a nonlinear optimization process. This creates a highly accurate characterization of the display's channel nonlinearities.

The present invention uses heterochromatic-flicker photometry or heterochromatic-brightness matching photometry, to first obtain the display channel luminance ratios contained in the calorimetric mixing matrix. This process is followed by a neutral estimation process that uses the channel luminance ratios and the chromaticities of a neutral stimulus to determine the channel chromaticities. For a three-channel, additive display device such as a cathode ray tube (CRT) or a liquid crystal display (LCD), the CIE tristimulus values (XYZ) of mixtures of the three primaries are obtained by summing the XYZ values contributed by the red, green, and blue channels. This relationship can be formalized by:

$$\begin{bmatrix} X \\ Y \\ Z \end{bmatrix}_{mixture} = \underbrace{\begin{bmatrix} X_{red} & X_{green} & X_{blue} \\ Y_{red} & Y_{green} & Y_{blue} \\ Z_{red} & Z_{green} & Z_{blue} \end{bmatrix}}_{M} \cdot \begin{bmatrix} r \\ g \\ b \end{bmatrix} \quad (1)$$

where $XYZ_{mixture}$ is the tristimulus value of the mixture of r amount of the red primary, g amount of the green primary, and b amount of the blue primary. The columns in the 3×3 matrix (M) shown in Eq. 1 represent the maximum XYZ tristimulus values of the red, green, and blue primaries. Thus, the range on the rgb scalars (also referred to as channel luminance scalars) is between 0 and 1. Modulating the values of the rgb scalars generates the range of mixture colors.

The white point of the system is commonly defined for the point when the rgb scalars are set to their full values (i.e., r=g=b=1). Therefore, the colorimetric value of the white point is given by:

$$\begin{bmatrix} X \\ Y \\ Z \end{bmatrix}_{white} = \begin{bmatrix} X_{red} & X_{green} & X_{blue} \\ Y_{red} & Y_{green} & Y_{blue} \\ Z_{red} & Z_{green} & Z_{blue} \end{bmatrix} \cdot \begin{bmatrix} 1 \\ 1 \\ 1 \end{bmatrix} \quad (2)$$

The chromaticities of a set of CIE tristimulus values is given by:

$$x = \frac{X}{X+Y+Z}, y = \frac{Y}{X+Y+Z}, \text{ and } z = \frac{Z}{X+Y+Z}. \quad (3)$$

Therefore, it is possible to reconstruct the CIE XYZ values from ratios of the chromaticities and the luminance of the color by:

$$X = Y \cdot \frac{\frac{X}{X+Y+Z}}{\frac{Y}{X+Y+Z}} = Y \cdot \frac{x}{y} \text{ and similarly } Z = Y \cdot \frac{z}{y} \quad (4)$$

For a system with fixed primaries, changing the ratios of the luminances of the red, green, and blue channels changes the white point of the system. For example, it is possible to rewrite the primaries matrix shown in Eq. 1 to have the form:

$$M = C \cdot L = \underbrace{\begin{bmatrix} \frac{x_{red}}{y_{red}} & \frac{x_{green}}{y_{green}} & \frac{x_{blue}}{y_{blue}} \\ 1 & 1 & 1 \\ \frac{z_{red}}{y_{red}} & \frac{z_{green}}{y_{green}} & \frac{z_{blue}}{y_{blue}} \end{bmatrix}}_{C} \cdot \underbrace{\begin{bmatrix} Y_{red} & 0 & 0 \\ 0 & Y_{green} & 0 \\ 0 & 0 & Y_{blue} \end{bmatrix}}_{L} \quad (5)$$

where $xyz_{red,green,blue}$ and $Y_{red,green,blue}$ are the chromaticities and the luminances of the red, green, and blue primaries respectively. By varying the ratios of $Y_{red,green,blue}$, the form of the L matrix changes. This in turn changes the form of the M matrix used to convert from rgb scalars to XYZ. This has a subsequent effect on the chromaticities of the white. For a given C matrix, the chromaticities of the white point are invariant with the absolute levels of $Y_{red}$, $Y_{green}$, and $Y_{blue}$ as long as the ratios of $Y_{red}/Y_{green}$ and $Y_{blue}/Y_{green}$ remain constant.

Thus, for a given white point and C matrix, it is possible to rewrite Eqs. 2 and 5 to solve for the channel luminances $Y_{red}$, $Y_{green}$, and $Y_{blue}$ that produce the desired white point, as shown in Eqs. 6-8.

$$\begin{bmatrix} X \\ Y \\ Z \end{bmatrix}_{white} = \begin{bmatrix} \frac{x_{red}}{y_{red}} & \frac{x_{red}}{y_{red}} & \frac{x_{red}}{y_{red}} \\ 1 & 1 & 1 \\ \frac{z_{red}}{y_{red}} & \frac{z_{green}}{y_{green}} & \frac{z_{blue}}{y_{blue}} \end{bmatrix} \cdot \begin{bmatrix} Y_{red} & 0 & 0 \\ 0 & Y_{green} & 0 \\ 0 & 0 & Y_{blue} \end{bmatrix} \cdot \begin{bmatrix} 1 \\ 1 \\ 1 \end{bmatrix} \quad (6)$$

$$\begin{bmatrix} X \\ Y \\ Z \end{bmatrix}_{white} = \begin{bmatrix} \frac{x_{red}}{y_{red}} & \frac{x_{red}}{y_{red}} & \frac{x_{red}}{y_{red}} \\ 1 & 1 & 1 \\ \frac{z_{red}}{y_{red}} & \frac{z_{green}}{y_{green}} & \frac{z_{blue}}{y_{blue}} \end{bmatrix} \cdot \begin{bmatrix} Y_{red} \\ Y_{green} \\ Y_{blue} \end{bmatrix} \quad (7)$$

$$\begin{bmatrix} Y_{red} \\ Y_{green} \\ Y_{blue} \end{bmatrix} = \begin{bmatrix} \frac{x_{red}}{y_{red}} & \frac{x_{red}}{y_{red}} & \frac{x_{red}}{y_{red}} \\ 1 & 1 & 1 \\ \frac{z_{red}}{y_{red}} & \frac{z_{green}}{y_{green}} & \frac{z_{blue}}{y_{blue}} \end{bmatrix}^{-1} \cdot \begin{bmatrix} X \\ Y \\ Z \end{bmatrix}_{white} \quad (8)$$

It is possible to scale the luminance matrix (L) in Eq. 5 by a constant value and not change the chromaticities of the mixture colors. This relationship is shown in Eqs. 9-13 (e.g., where the L matrix was normalized by the luminance of the green channel). In these cases the overall luminance of the display devices can be scaled to an arbitrary level and not effect the relative colorimetric-mixing characteristics of the device. In a color management system it is, often times, not important to know the absolute luminance of a display device (e.g., ones where it is not possible or not desirable to match the absolute luminances between the original and the reproductions).

$$M_{relative} = \quad (9)$$

$$C \cdot L_{relative} = \begin{bmatrix} \frac{x_{red}}{y_{red}} & \frac{x_{green}}{y_{green}} & \frac{x_{blue}}{y_{blue}} \\ \frac{z_{red}}{y_{red}} & \frac{z_{green}}{z_{blue}} & \frac{z_{blue}}{y_{blue}} \end{bmatrix} \cdot \begin{bmatrix} Y_{red} & 0 & 0 \\ 0 & Y_{green} & 0 \\ 0 & 0 & Y_{blue} \end{bmatrix} \cdot \frac{1}{Y_{green}}$$

$$M_{relative} = C \cdot L_{relative} = \begin{bmatrix} \frac{x_{red}}{y_{red}} & \frac{x_{green}}{y_{green}} & \frac{x_{blue}}{y_{blue}} \\ \frac{z_{red}}{y_{red}} & \frac{z_{green}}{z_{blue}} & \frac{z_{blue}}{y_{blue}} \end{bmatrix} \cdot \begin{bmatrix} \frac{Y_{red}}{Y_{green}} & 0 & 0 \\ 0 & 1 & 0 \\ 0 & 0 & \frac{Y_{blue}}{Y_{green}} \end{bmatrix} \quad (10)$$

It follows that if one color is a scaled version of another color, their chromaticities are equal. Therefore, if $XYZ_1 = \alpha XYZ_2$ then:

$$x_1 = \frac{X_1}{X_1+Y_1+Z_1}, y_1 = \frac{Y_1}{X_1+Y_1+Z_1}, \text{ and} \quad (11)$$

$$z_1 = \frac{Z_1}{X_1+Y_1+Z_1}$$

and $$x_2 = \frac{\alpha X_1}{\alpha(X_1+Y_1+Z_1)}, y_2 = \frac{\alpha Y_1}{\alpha(X_1+Y_1+Z_1)}, \text{ and} \quad (12)$$

$$z_2 = \frac{\alpha Z_1}{\alpha(X_1+Y_1+Z_1)}$$

Thus, for the case of one color being a scaled version of another color:

$$x_1 = x_2, y_1 = y_2, \text{ and } z_1 = z_2. \quad (13)$$

As such, a model of the display's relative colorimetric mixing characteristics is obtained by solving for the luminance ratios shown in Eq. 10. The formalism developed in Eq. 10 showed the relative luminance matrix ($L_{relative}$) normalized by the luminance of the green channel. The green channel was picked for illustration purposes only. (In practice any display channel could have been used for this normalization.)

Visual estimation of display channel luminance ratios can be achieved using a heterochromatic flicker photometry process that employs a reference patch having a predefined color and test stimulus having adjustable pure channel colors by adjusting each pure channel color to have the same luminance as the reference color until the flicker is minimized.

Heterochromatic brightness matching is a well-established psychophysical technique for measuring visual processes. Typically two psychophysical techniques are utilized in a heterochromatic brightness matching technique. Referring to FIG. 1, the first technique utilizes a display patch 10 that includes bipartite field 12 in which one half 14 is a reference stimulus (S1) and the other half 16 is the test stimulus (S2) against a background 18. Often times, the reference stimulus (S1) is an achromatic color and the test stimulus (S2) is a chromatic color. The viewer's task is to adjust the intensity of the test stimulus (S2) until it matches the brightness of the reference stimulus (S1). This judgement is often made easier by having the viewer adjust the test stimulus until the edge (L1) that is formed between the two fields is the least distinct. However, in general, this process is rarely used because it is difficult to visually discount the differences in hue and chroma between the two fields.

Figure 2:
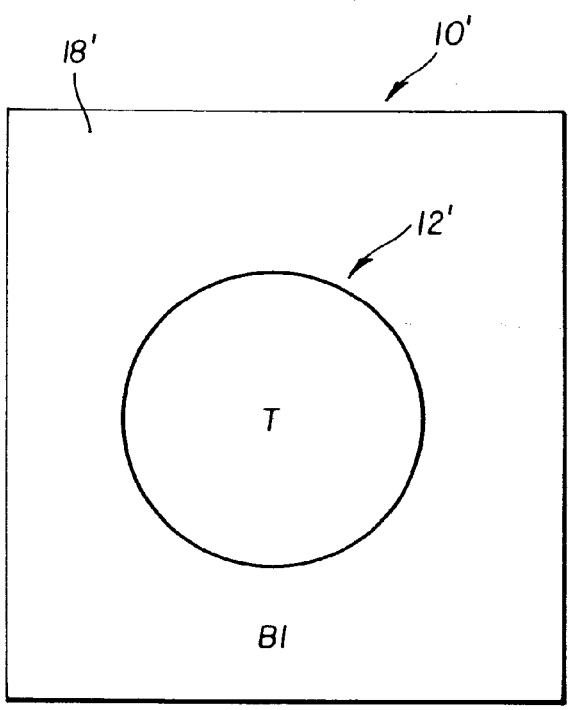
FIG. 2 is a diagram useful in explaining the prior art method of heterochromatic flicker photometry.
Figure 3:
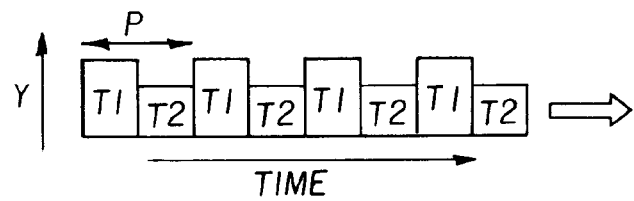
FIG. 3 is a timing and intensity diagram useful in describing the prior art method of flicker photometry.
Figure 4:
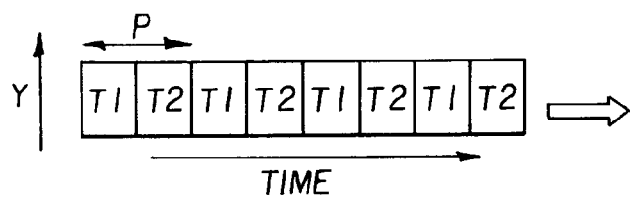
FIG. 4 is a timing and intensity diagram useful in describing the prior art method of flicker photometry.

Referring to FIG. 2, a second process for heterochromatic brightness matching uses a flicker process whereby spatially coincident stimuli are alternately presented at some predefined temporal rate in a patch 10' having a stimulus area 12' and a background 18'. Referring to FIG. 3, one of the stimuli is a reference field with a predefined luminance level T1. This stimulus can either be achromatic or chromatic. The other stimulus T2 is generally chromatic and adjustable in luminance. The viewer adjusts the luminance of this test stimulus T2 until the perceived flicker is minimized or eliminated. As shown in FIG. 4, the flicker is minimized or eliminated when the luminance of T1 equals the luminance of T2.

Figure 5:
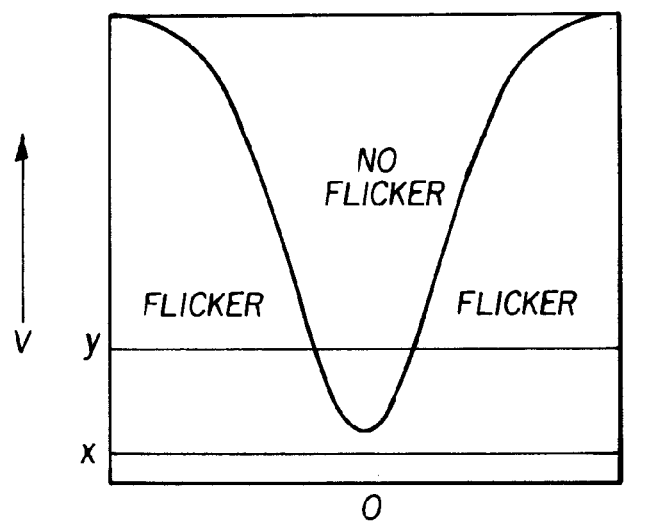
FIG. 5 is a diagram useful in describing the perception of flicker in prior art heterochromatic photometry experiments.

Referring to FIG. 5, it is known that the ability for the viewer to completely eliminate the appearance of flicker depends on the luminance and the chromatic differences between the reference stimulus T1 and the test stimulus T2. For a given rate of flicker V, the viewer will only be able to eliminate flicker if the luminance ratio of the two stimuli is within a given range. This range is a function of flicker rate and color difference between the stimuli. If the flicker rate V is low and the color difference between the patches is large, then the viewer may never be able to completely eliminate the appearance of flicker even if the luminances of the stimuli are equal (e.g., line x in FIG. 5). In this case, the experimenter can increase the flicker rate V so that stimulus fusion is possible with the given color or instruct the viewer to adjust the intensity to the point of minimum flicker. If the flicker rate V is too high, then there will be a range of stimulus ratios where the viewer can eliminate flicker, (e.g., line y in FIG. 5). In this case, the experimenter can either reduce the flicker rate or instruct the viewer to bisect the stimulus range of temporal fusion to estimate the luminance match.

For the case of determining the ratios of the display luminances, consider the following minimum flicker process. The reference stimulus T1 is some fraction of the luminance of the sum of the luminances of the display channels. If the luminance of the reference stimulus T1 is less than or equal to that of the channel with the smallest individual luminance, then a luminance match is possible using any of the individual channels. Given these conditions, consider the process where the test stimulus T2 is one of the display's individual channels (i.e., pure red, green, or blue). The two stimuli are presented at some frequency V slow enough that the stimuli don't temporally fuse for a large ratio of stimuli luminances, but high enough that the flicker is minimal or null when the physical luminances of the stimuli are matched.

The viewer's task is to adjust the intensity of the individual channel T2 to the point of minimum or null flicker. This process is repeated for all display channels individually. This process results in a set of data that represents the percentage of each display channel that is required to match a given stimulus. For example, consider the case of a three-channel display. Suppose, for channel 1, $\alpha$ percent of that channel's maximum luminance was required to minimize the flicker. Additionally, for channels 2 and 3, $\beta$ and $\kappa$ percent of their respective maximum luminances were needed to minimize the flicker. For the case where $\alpha < \beta < \kappa$, it is possible to say that the $Y_1 > Y_2 > Y_3$ where $Y_1$, $Y_2$, and $Y_3$ are the maximum luminances of the three channels. The inverses of ratios of the channel percentages are equivalent to the ratios given in Eq. 10. This relationship is formalized in Eqs. 14-21.

Consider a white point whose XYZ values equal the sum of the XYZ values of the display channels. Then, $$Y_{white} = Y_{red} + Y_{green} + Y_{blue}. \tag{14}$$

Consider a neutral color that has a luminance equal to some fraction of the $Y_{white}$. Then, $$Y_n = a \cdot Y_{white}. \tag{15}$$

Suppose that $\alpha$ is small such that $$Y_n \leq \min \begin{bmatrix} Y_{red} \\ Y_{green} \\ Y_{blue} \end{bmatrix}. \tag{16}$$

For the red channel suppose that the flicker is minimized or null when a percent of the red channel luminance was used to match the luminance of $Y_n$. Then, $$Y_n = \alpha \cdot Y_{red} \tag{17}$$

(Note: For a CRT display, $\alpha$ is generally nonlinearly related to the input digital counts driving the display. Thus, $$\alpha = f(\alpha'), \tag{18}$$

where the function described by $f$ can be either linear or nonlinear and $\alpha'$ is the digital count (or code value) of the signal driving the display.)

It follows from Eq. 17 that, $$\alpha = \frac{Y_n}{Y_{red}}. \tag{19}$$

Similar expressions can be written for the green and blue channels such that:

$$\beta = \frac{Y_n}{Y_{green}} \text{ and} \tag{20}$$

$$\kappa = \frac{Y_n}{Y_{blue}}. \tag{21}$$

Recall that the goal of this process was to determine the ratios of $Y_{red}/Y_{green}$ and $Y_{blue}/Y_{green}$. Therefore, using the relationships formed in Eqs. 19-21, it follows that the channel luminance ratios are obtained by $$\frac{\beta}{\alpha} = \frac{\frac{Y_n}{Y_{green}}}{\frac{Y_n}{Y_{red}}} = \frac{Y_{red}}{Y_{green}} \qquad (22)$$

and $$\frac{\beta}{\kappa} = \frac{\frac{Y_n}{Y_{green}}}{\frac{Y_n}{Y_{blue}}} = \frac{Y_{blue}}{Y_{green}}. \qquad (23)$$

The only unknown in this process is the conversion from device digital code values (f) to channel luminance scalars. One way of determining this conversion is by solving for the display channel nonlinearities given by Daly et al. (supra). Another way of solving for the display channel nonlinearities is to use the process described by Yang and Miller (supra).

Given the channel luminance ratios ($Y_{red}/Y_{green}$ and $Y_{blue}/Y_{green}$) it is then possible to determine the chromaticities of the display's color channels using a neutral identification process. As used herein, a color is said to be neutral if its visual appearance is devoid of hue. Thus, a neutral sample appears neither reddish nor greenish and neither yellowish nor bluish. Psychometrically, a colored patch with CIE 1931 chromaticities coordinates of approximately $xyz_N$=[0.3128, 0.3292, 0.3580] viewed with a black surround appears neutral. Thus, the neutral chromaticities ($xyz_N$) can be converted to CIE 1931 XYZ tristimulus values ($XYZ_N$) for a nominal luminance value ($Y_N$) according to Eq. 4.

Given a set of candidate channel chromaticities for the display and the visually determined channel luminance ratios, a series of relative calorimetric mixing matrices are generated according to Eq. 10. Using the series of relative calorimetric mixing matrices and the $XYZ_N$ tristimulus values of the neutral color a set of candidate neutral color channel luminance scalars are calculated using rgb=$(M_i)^{-1}$ $XYZ_N$, where $rgb_i$ and $(M_i)^{-1}$ are the candidate neutral color channel luminance scalars and the inverse of the relative colorimetric mixing matrix for the $i^{th}$ candidate set of channel chromaticities. The chromaticities of displays vary from display to display and from manufacture to manufacture. As such, the candidate channel chromaticity set should represent this variability. One skilled in the art will recognize that chromaticity data are available from display manufactures or that these data can be obtained by colorimetric measurements of a population of displays. The method for gathering the candidate channel chromaticities is not central to the present invention—it is sufficient that the data be known.

The set of candidate neutral color channel luminance scalars are converted to candidate neutral color channel digital counts using the inverse of the display's channel nonlinearities given in Eq. 18. The set of candidate neutral color channel digital counts are presented to the viewer in a manner that allows them to determine which of the candidate neutral color channel digital count sets appears the most neutral. The relative colorimetric mixing matrix that produced the candidate neutral color channel digital counts set that appeared the most neutral is selected as the relative calorimetric mixing matrix to represent the display.

Figure 6:
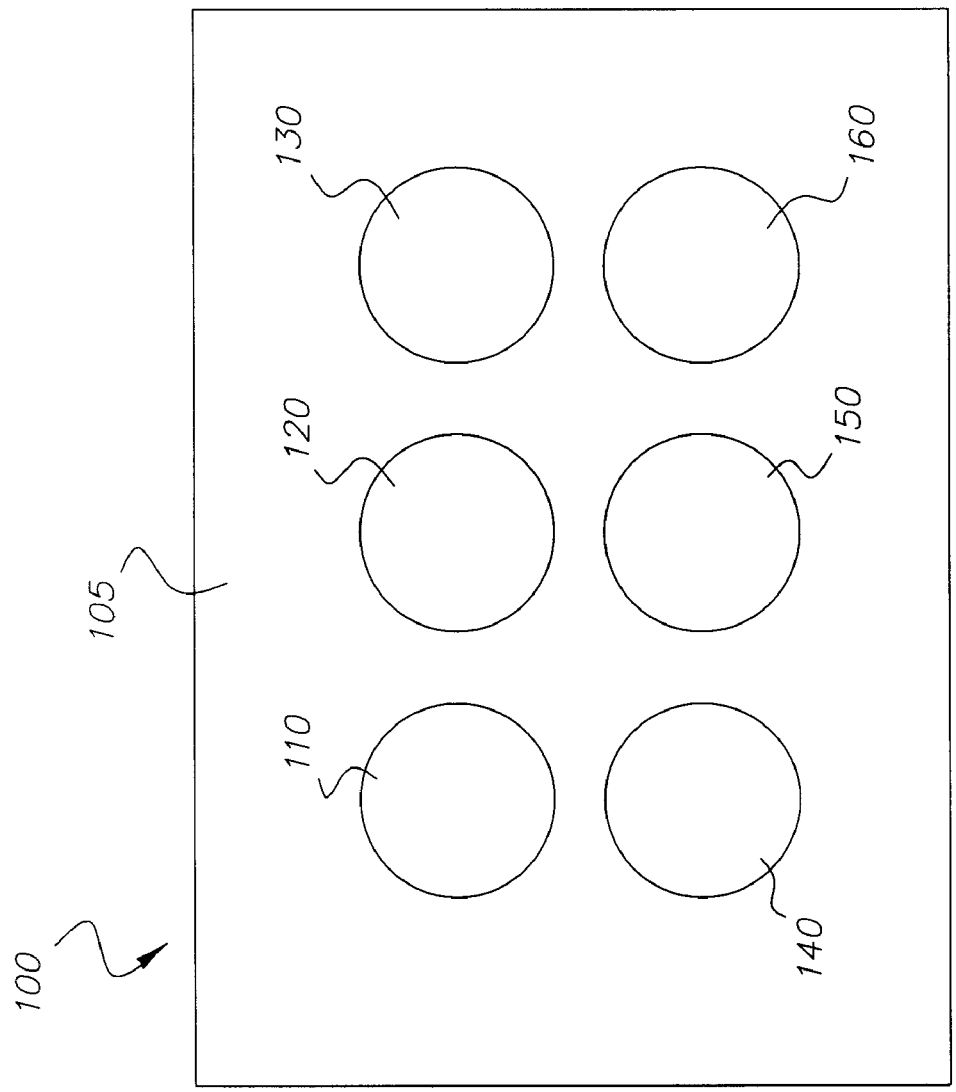
FIG. 6 is a diagram useful in describing the presentation of the candidate neutral color patches.

The set of candidate neutral channel digital counts are used to create set of candidate neutral color patches. Referring to FIG. 6, the candidate neutral patches (110, 120, 130, 140, 150, 160) are displayed on the display (100) with a black background (105). The viewer is instructed to select the candidate neutral color patch that appears most neutral.

Figure 7:
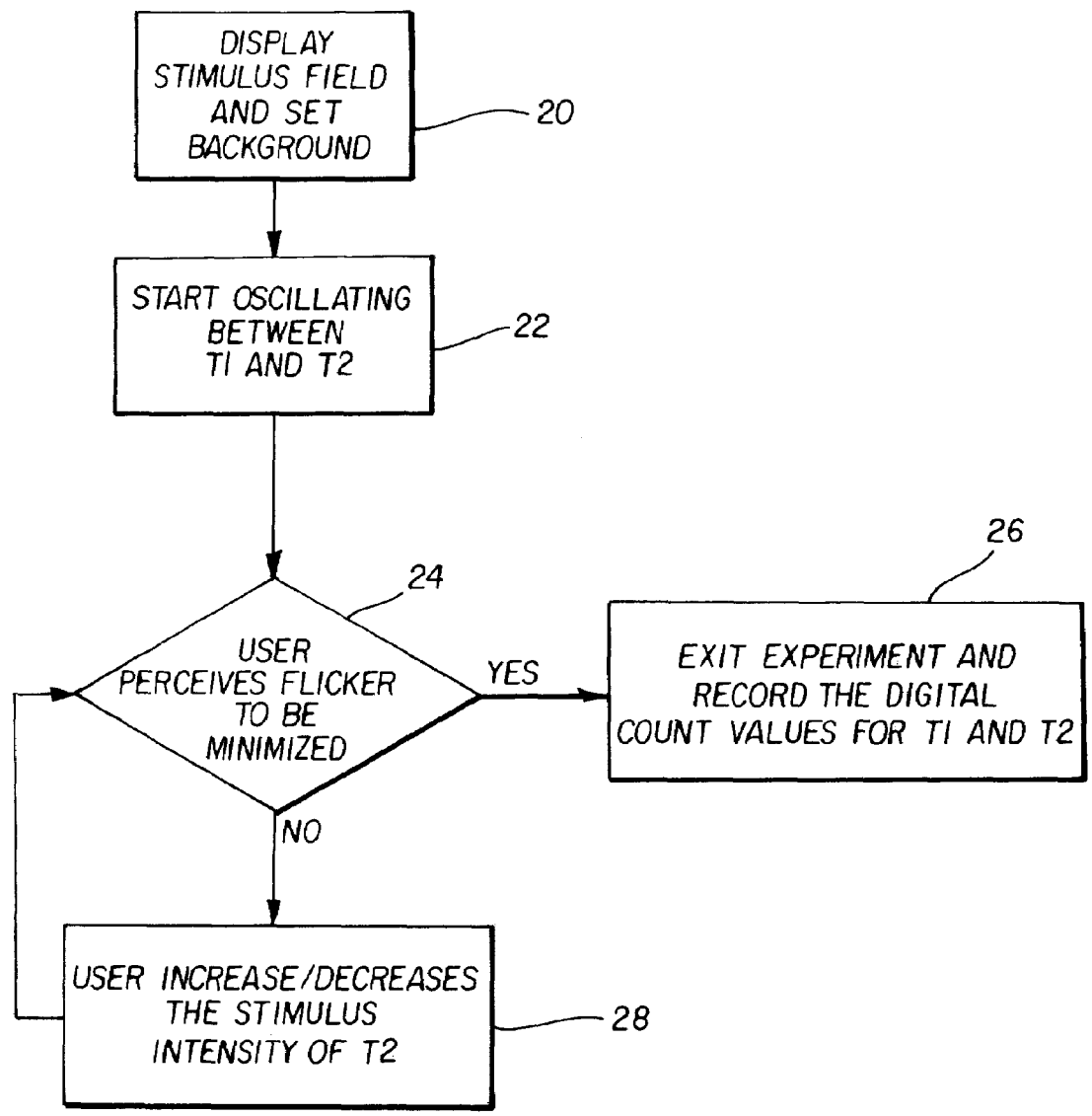
FIG. 7 is a flow chart illustrating the method of the present invention.

A process for determining the channel luminance ratios and the display's relative colorimetric mixing matrix from viewer adjustments using a heterochromatic flicker photometry process is shown in FIG. 7. The process begins by displaying (20) a stimulus field T (12'), as shown in FIG. 2, and setting the background B1 (18') to initial values. The stimulus field T is then oscillated (22) between stimuli T1 and T2, as shown in FIG. 3, at a flicker rate V (e.g., V=1/P). The viewer then adjusts a control (through an interface to a computer that is used to generate the display, such as by the keyboard or the mouse) to increase or decrease the intensity of stimulus T2. If the viewer perceives the flicker between T1 and T2 to be minimized (24), they exit the process (26) and the host computer records the digital count values for T1 and T2. If the viewer decides that the flicker between T1 and T2 is not minimized, the viewer continues to adjust T2 (28) and make judgements on the perceived flicker until the flicker is minimized. At that point, the host computer records the digital counts of stimuli T1 and T2. This process is performed three times: once each for the red, green, and blue channels.

There are several stimulus presentation options for minimizing the flicker between T1 and T2. In one option the process used to minimize the flicker between T1 and T2 uses a method of adjustments process where the viewer can directly control the intensity of T2 using a computer mouse, keyboard, or other computer interface apparatus. In another option an iterative searching process is employed where the viewer is instructed to select one of a number of displayed patches that are flickering where all of the patches have the same T1 component and different T2 component. Initially the intensity range of the T2 components of the patches covers the full range possible for T2. Thus, initially at least one of the displayed patches has a T2 value equal to the minimum T2 value and one of the displayed patches has a T2 value equal to the maximum T2 value. The viewer is instructed to identify the patch that appears to be flickering the least. Based on the T2 value of the patch the viewer identified as flickering the least, a new range of T2 values is defined based on a range subdivision process. The process of identifying the patch that is flickering the least and performing the range subdivision on T2 is repeated until the range subdivision process results in a single digital count value. One skilled in the art will recognize that there are many rules governing the range subdivision in an iterative searching process. In one embodiment of the present invention, a direct binary search rule is used to perform the range subdivision process. A "Golden Section" rule can also be used to perform the range subdivision process. The method used to perform the range subdivision process has been described in detail with particular reference to certain embodiments thereof, but it will be understood that variations and modifications can be effected within the spirit and scope of the invention.

The data collected from these processes comprises a set of digital count triplets: one for each of the display channels. These digital count triplets represent the T2 values that minimized the flicker between the reference stimulus T1 and the pure channel color. These digital count triplets are converted into channel luminance ratios using the following procedure. First the stimulus digital count values ([RGB]$_{pure}$) are converted to calorimetric channel scalars ([rgb]$_{pure}$) using a predetermined function ($f$) as described by Eq. 18 giving:

$$r_{pure}=f(R_{pure}), g_{pure}=f(G_{pure}), \text{ and } b_{pure}=f(B_{pure}) \quad (24)$$

According to the relationships given in Eqs. 22 and 23, the pure channel luminance scalars are converted into display channel luminance ratios:

$$\frac{Y_{red}}{Y_{green}} = \frac{g_{pure}}{r_{pure}} \quad (25)$$

and $$\frac{Y_{blue}}{Y_{green}} = \frac{g_{pure}}{b_{pure}} \quad (26)$$

The display's relative calorimetric mixing matrix (M) is then obtained using the relationship given in Eq. 10 using the channel luminance ratios and the chromaticities obtained in the neutral identification process.

In the embodiment described above, the red, green, and blue channel luminance ratios were estimated by minimizing the flicker between a neutral patch and a pure channel patch (i.e., either red, green, or blue). The pure channel approach works well for the situation where relatively high flicker rates are possible. Since the chromatic difference between the reference stimulus T1 and the test stimulus T2 is large for the single channel approach described above, the flicker rate needs to be high in order to eliminate the flicker between the two stimuli even when a luminance match is achieved.

In order to help reduce this effect, the heterochromatic flicker photometry is modified to include the addition of a base stimulus (Tb) to the test (T2) stimulus wherein a reference patch having a predefined color and test stimuli having a constant predetermined base and adjustable pure channel colors. The flicker is minimized by adjusting each pure channel color to have the same luminance as the reference color.

In this case, the reference stimulus T1 is the same as given in Eq. 15. Now, instead of being a pure channel, the test stimulus T2 is composed of two parts. The first part is a base stimulus (Tbase) that is lower in luminance than the reference stimulus T1. Added to this base stimulus is a pure channel stimulus (Tpure) that contributes the added luminance necessary to either minimize or eliminate the flicker between the reference patch T1 and the test patch (T2=Tbase+Tpure). By introducing the base stimulus luminance (Tbase), the initial luminance difference between the reference stimulus T1 and the test stimulus T2 is decreased when compared to the pure channel approach. Thus, the amount of extra pure channel luminance (Tpure) needed to create a luminance match is less. By reducing the amount of pure channel luminance contribution (Tpure) to the match, the chromatic differences between the reference T1 and the test T2 stimuli is reduced, making the psychophysical task easier. This stimulus configuration and the psychophysical searching processes advantages the present invention compared to the process taught in the art.

The mathematics of this approach are very similar to those given above and are formalized in Eqs. 27-36. Consider the reference patch T1 whose chromaticities are the same as the white point and whose luminance is some fraction (b) of the white, Eq. 27. Also, consider a base stimulus (Tbase) whose luminance is a different, but smaller, fraction (c) of the white (i.e., b>c), Eq. 28. Thus, $$Y_n = b \cdot Y_{white} = b \cdot Y_{red} + b \cdot Y_{green} + b \cdot Y_{blue} \quad (27)$$

$$Y_{base} = c \cdot Y_{white} = c \cdot Y_{red} + c \cdot Y_{green} + c \cdot Y_{blue} \quad (28)$$

where b and c are selected such that, $$Y_n - Y_{base} \le \min\begin{bmatrix} Y_{red} - c \cdot Y_{red} \\ Y_{green} - c \cdot Y_{green} \\ Y_{blue} - c \cdot Y_{blue} \end{bmatrix}. \quad (29)$$

The constraint imposed by Eq. 29 insures that there is enough pure channel luminance (Tpure) available to overcome the luminance difference between the reference (T1) and the base stimuli (Tbase). A luminance match between the reference patch T1 and the test patch T2 is achieved when:

$$Y_n = Y_{test} = Y_{base} + Y_{pure} \quad (30)$$

where $Y_{pure}$ is the added red, green, or blue single channel luminance need to make up the luminance difference between the reference ($Y_n$) and the base ($Y_{base}$) stimuli luminances. Therefore, for the case of using $\epsilon_{red}$ of the red channel to make up the luminance difference, $$b \cdot Y_{white} = c \cdot Y_{white} + \epsilon_{red} \cdot Y_{red}. \quad (31)$$

Solving for $\epsilon_{red}$ yields, $$\epsilon_{red} = \frac{Y_n - Y_{base}}{Y_{red}}. \quad (32)$$

Similar relationships can be written for the green and blue channels:

$$\epsilon_{green} = \frac{Y_n - Y_{base}}{Y_{green}} \quad (33)$$

and $$\epsilon_{blue} = \frac{Y_n - Y_{base}}{Y_{blue}}. \quad (34)$$

Recall that the underlying task was to determine the ratios of the channel luminances (e.g., $Y_{red}/Y_{green}$ and $Y_{blue}/Y_{green}$). Therefore, using the relationships given in Eqs. 32-34 the channel luminance ratios are obtained by:

$$\frac{\epsilon_{green}}{\epsilon_{red}} = \frac{\frac{Y_n - Y_{base}}{Y_{green}}}{\frac{Y_n - Y_{base}}{Y_{red}}} = \frac{Y_{red}}{Y_{green}} \quad (35)$$

and $$\frac{\epsilon_{green}}{\epsilon_{blue}} = \frac{\frac{Y_n - Y_{base}}{Y_{green}}}{\frac{Y_n - Y_{base}}{Y_{blue}}} = \frac{Y_{blue}}{Y_{green}}. \quad (36)$$

This process requires that the parameters $\epsilon_{red}$, $\epsilon_{green}$, and $\epsilon_{blue}$, from Eqs. 32-34, be determined experimentally. The psychophysical task can either be minimum flicker or heterochromatic brightness matching of a bipartite field. The process used to perform the heterochromatic photometry task can consist of any of the stimulus presentation techniques given above. For illustration purposes, consider the minimum flicker task (FIG. 7) where the display's digital code values for the reference patch T1 are given by:

$$T_1 = \begin{bmatrix} R \\ G \\ B \end{bmatrix}_{ref} \quad (37)$$

where $R_{ref}=G_{ref}=B_{ref}$. Also, consider a test stimulus (T2) that has as a base component (Tbase) with a digital count value of $$T_{base} = \begin{bmatrix} R \\ G \\ B \end{bmatrix}_{base} \quad (38)$$

where $R_{base}=G_{base}=B_{base}<R_{ref}$ and a variable component Tpure. The component (Tpure) is added to a selected channel of Tbase. The digital counts associated with the test stimulus composed of an adjustable red component of T2 are given by:

$$T_{2_{Case1}} = \begin{bmatrix} R \\ G \\ B \end{bmatrix}_{testR} = \begin{bmatrix} R \\ G \\ B \end{bmatrix}_{base} + \begin{bmatrix} R \\ 0 \\ 0 \end{bmatrix}_{pure} = \begin{bmatrix} R_{base}+R_{pure} \\ G_{base} \\ B_{base} \end{bmatrix} \quad (39)$$

For the cases where the pure green or blue channels are used to minimize the flicker, the test stimulus (T2) takes on the forms:

$$T_{2_{Case2}} = \begin{bmatrix} R \\ G \\ B \end{bmatrix}_{testG} = \begin{bmatrix} R \\ G \\ B \end{bmatrix}_{base} + \begin{bmatrix} 0 \\ G \\ 0 \end{bmatrix}_{pure} = \begin{bmatrix} R_{base} \\ G_{base}+G_{pure} \\ B_{base} \end{bmatrix} \quad (40)$$

and $$T_{2_{Case3}} = \begin{bmatrix} R \\ G \\ B \end{bmatrix}_{testB} = \begin{bmatrix} R \\ G \\ B \end{bmatrix}_{base} + \begin{bmatrix} 0 \\ 0 \\ B \end{bmatrix}_{pure} = \begin{bmatrix} R_{base} \\ G_{base} \\ B_{base}+B_{pure} \end{bmatrix} \quad (41)$$

Therefore, the data that gets returned from the process are the test stimulus code values (T2) for the red, green, and blue cases. These data are used to predict the channel luminance ratios using the following analysis.

The data are converted to relative calorimetric channel luminance scalars using the predetermined channel nonlinearites for the display (e.g., (f) from Eq. 18). The channel luminance scalars (denoted by the lower case r,g,b) for the reference and the base stimuli are given by:

$$\begin{bmatrix} r \\ g \\ b \end{bmatrix}_{ref} = f\left(\begin{bmatrix} R \\ G \\ B \end{bmatrix}_{ref}\right) \text{ and} \quad (42)$$

$$\begin{bmatrix} r \\ g \\ b \end{bmatrix}_{base} = f\left(\begin{bmatrix} R \\ G \\ B \end{bmatrix}_{base}\right) \quad (43)$$

where the function (f) has been determined using some visual estimation process, such as that given by Daly et al. (supra). For the case where the flicker between the reference (T1) and the test (T2) stimuli was minimized by adjusting the red channel of the test stimulus until the digital code values were:

$$\begin{bmatrix} R \\ G \\ B \end{bmatrix}_{testR} = \begin{bmatrix} R_{test} \\ G_{base} \\ B_{base} \end{bmatrix}. \quad (44)$$

The channel scalars for this stimulus are given by:

$$\begin{bmatrix} r \\ g \\ b \end{bmatrix}_{testR} = f\left(\begin{bmatrix} R \\ G \\ B \end{bmatrix}_{testR}\right) = \begin{bmatrix} r_{test} \\ g_{base} \\ b_{base} \end{bmatrix} = \begin{bmatrix} r_{base}+r_{pure} \\ g_{base} \\ b_{base} \end{bmatrix} \quad (45)$$

where $r_{pure}$ is the extra red channel luminance needed to match the reference (T1) patch or minimize the flicker. The amount of the pure channel red luminance needed to make up the difference between the base color and the reference color is given by:

$$\begin{bmatrix} r \\ g \\ b \end{bmatrix}_{pureR} = \begin{bmatrix} r \\ g \\ b \end{bmatrix}_{testR} - \begin{bmatrix} r \\ g \\ b \end{bmatrix}_{base} = \begin{bmatrix} r_{base}+r_{pure} \\ g_{base} \\ b_{base} \end{bmatrix} - \begin{bmatrix} r \\ g \\ b \end{bmatrix}_{base} = \begin{bmatrix} r_{pure} \\ 0 \\ 0 \end{bmatrix} \quad (46)$$

When the process is repeated for the cases where the pure green and blue channels are used to make up the luminance difference between the base color and the reference color then the following relationships can be determined:

$$\begin{bmatrix} r \\ g \\ b \end{bmatrix}_{pureG} = \begin{bmatrix} r \\ g \\ b \end{bmatrix}_{testG} - \begin{bmatrix} r \\ g \\ b \end{bmatrix}_{base} \quad (47)$$

$$= \begin{bmatrix} r_{base} \\ g_{base}+g_{pure} \\ g_{base} \end{bmatrix} - \begin{bmatrix} r \\ g \\ b \end{bmatrix}_{base}$$

$$= \begin{bmatrix} 0 \\ g_{pure} \\ o \end{bmatrix}$$

and

-continued $$\begin{bmatrix} r \\ g \\ b \end{bmatrix}_{pureB} = \begin{bmatrix} r \\ g \\ b \end{bmatrix}_{testB} - \begin{bmatrix} r \\ g \\ b \end{bmatrix}_{base} \qquad (48)$$

$$= \begin{bmatrix} r_{base} \\ g_{base} \\ b_{base} + b_{pure} \end{bmatrix} - \begin{bmatrix} r \\ g \\ b \end{bmatrix}_{base}$$

$$= \begin{bmatrix} 0 \\ 0 \\ b_{pure} \end{bmatrix}.$$

The ratios of the $Y_{red}/Y_{green}$ and $Y_{blue}/Y_{green}$ are calculated using the relationships given in Eqs. 25 and 26 by:

$$\frac{Y_{red}}{Y_{green}} = \frac{g_{pure}}{r_{pure}} \qquad (49)$$

and $$\frac{Y_{blue}}{Y_{green}} = \frac{g_{pure}}{b_{pure}}. \qquad (50)$$

These ratios are used in combination with a C matrix, determined from a neutral identification process, to generate a relative colorimetric mixing matrix for the display (Eq. 10).

According to a further alternative approach, stimuli other than Red, Green, and Blue are employed. In the general case, the heterochromatic flicker photometry includes a reference patch having a predefined color and test stimuli having a constant predetermined base and adjustable mixed channel colors. The flicker is minimized by adjusting each mixed channel color to have the same luminance as the reference color.

This approach uses stimuli other than pure red, green, and blue. In this case, any set of three colors, with a common base, can be flickered against any other color. Therefore, in this approach, it is convenient to define the relative colorimetric channel scalars for the reference stimulus T1 as $$T_1 = \begin{bmatrix} r \\ g \\ b \end{bmatrix}_{ref} \qquad (51)$$

and a test stimulus (T2) with a base stimulus (Tbase) as $$T_2 = T_{base} + T_s = \begin{bmatrix} r \\ g \\ b \end{bmatrix}_{base} + \begin{bmatrix} r \\ g \\ b \end{bmatrix}_s \qquad (52)$$

where the luminance of T1 (given by Y1) is greater that the luminance of Tbase (given by Ybase). Thus, consider the process where T1 is initially flickered against Tbase at a rate defined by V, such that flicker is perceived by the viewer. In this process, consider the case where the flicker is minimized, in three separate trials, with three different stimuli (Ts) being added to Tbase. These stimuli are represented by:

$$T_{s_1} = \begin{bmatrix} r \\ g \\ b \end{bmatrix}_1, \quad T_{s_2} = \begin{bmatrix} r \\ g \\ b \end{bmatrix}_2, \text{ and } T_{s_3} = \begin{bmatrix} r \\ g \\ b \end{bmatrix}_3 \qquad (53)$$

where the subscripts 1, 2 and 3 represent the colorimetric channel scalars of the stimuli added to (Tbase) for the three trials. Since the flicker was minimized in each of these trials, the luminance of T1 (Y1) was equal to the luminance T2 (Y2 =Ybase+Y(Ts1)=Ybase+Y(Ts2)=Ybase+Y(Ts3)). Based on this relationship it is possible to make the following generalization:

$$\begin{bmatrix} Y_1 \\ Y_1 \\ Y_1 \end{bmatrix} = \begin{bmatrix} Y_{base} \\ Y_{base} \\ Y_{base} \end{bmatrix} + \begin{bmatrix} r_1 & g_1 & b_1 \\ r_2 & g_2 & b_2 \\ r_3 & g_3 & b_3 \end{bmatrix} \cdot \begin{bmatrix} Y_{red} \\ Y_{green} \\ Y_{blue} \end{bmatrix} \qquad (54)$$

where the rows of the matrix are the colorimetric channel scalars for three flicker minimization trials respectively. Notice that in each of the trials, the values for Y1 and Ybase are constant. Also, recall that the goals of these processes are to solve for the ratios of Yred/Ygreen and Yblue/Ygreen, not the absolute values of the channel luminances. Therefore, Eq. 54 can be rewritten as:

$$\begin{bmatrix} Y_1 \\ Y_1 \\ Y_1 \end{bmatrix} - \begin{bmatrix} Y_{base} \\ Y_{base} \\ Y_{base} \end{bmatrix} = \Delta l \cdot \begin{bmatrix} 1 \\ 1 \\ 1 \end{bmatrix} = \begin{bmatrix} r_1 & g_1 & b_1 \\ r_2 & g_2 & b_2 \\ r_3 & g_3 & b_3 \end{bmatrix} \cdot \begin{bmatrix} Y_{red} \\ Y_{green} \\ Y_{blue} \end{bmatrix} \qquad (55)$$

where ($\Delta l$) is a constant that is equal to the luminance difference between the base (Tbase) and the reference stimuli T1. Solving for the display channel luminances yields:

$$\begin{bmatrix} Y_{red} \\ Y_{green} \\ Y_{blue} \end{bmatrix} = \begin{bmatrix} r_1 & g_1 & b_1 \\ r_2 & g_2 & b_2 \\ r_3 & g_3 & b_3 \end{bmatrix}^{-1} \cdot \Delta l \cdot \begin{bmatrix} 1 \\ 1 \\ 1 \end{bmatrix} \qquad (56)$$

Dropping the absolute luminance term ($\Delta l$) yields relative channel luminance factors given by:

$$\begin{bmatrix} \hat{Y}_{red} \\ \hat{Y}_{green} \\ \hat{Y}_{blue} \end{bmatrix} = \begin{bmatrix} r_1 & g_1 & b_1 \\ r_2 & g_2 & b_2 \\ r_3 & g_3 & b_3 \end{bmatrix}^{-1} \cdot \begin{bmatrix} 1 \\ 1 \\ 1 \end{bmatrix} \qquad (57)$$

The display's channel-luminance ratios are calculated using these relative luminance factors using:

$$\frac{Y_{red}}{Y_{green}} = \frac{\hat{Y}_{red}}{\hat{Y}_{green}} \qquad (58)$$

and

-continued $$\frac{Y_{blue}}{Y_{green}} = \frac{\hat{Y}_{blue}}{\hat{Y}_{green}} \quad (59)$$

The same visual process described above can be used to collect the data necessary to calculate the display's channel-luminance ratios. The only difference in this case is that the stimuli used to overcome the luminance difference between T1 and Tbase are not necessarily pure channel signals. They can have any RGB digital counts that produce the correct luminance (i.e., the luminance difference between T1 and Tbase). The data from this process consist of RGBref (Eq. 42), RGBbase, (Eq. 43), and the RGB values for three T2 values (shown in Eqs. 60-62) that minimized the flicker between T1 and T2.

$$T_{2_{Case1}} = f\left(\begin{bmatrix} R \\ G \\ B \end{bmatrix}_{Case1}\right) = \begin{bmatrix} r \\ g \\ b \end{bmatrix}_{Case1} \quad (60)$$

$$T_{2_{Case2}} = f\left(\begin{bmatrix} R \\ G \\ B \end{bmatrix}_{Case2}\right) = \begin{bmatrix} r \\ g \\ b \end{bmatrix}_{Case2} \quad (61)$$

$$T_{2_{Case3}} = f\left(\begin{bmatrix} R \\ G \\ B \end{bmatrix}_{Case3}\right) = \begin{bmatrix} r \\ g \\ b \end{bmatrix}_{Case3} \quad (62)$$

The test stimuli (T2) for the three cases are decomposed into base (Tbase) and added components (Ts) by subtracting off the calorimetric channel scalars of the base from the test stimuli, giving:

$$T_{S_{Case1}} = \begin{bmatrix} r \\ g \\ b \end{bmatrix}_{Case1} - \begin{bmatrix} r \\ g \\ b \end{bmatrix}_{base} = \begin{bmatrix} r_1 \\ g_1 \\ b_1 \end{bmatrix} \quad (63)$$

$$T_{S_{Case2}} = \begin{bmatrix} r \\ g \\ b \end{bmatrix}_{Case2} - \begin{bmatrix} r \\ g \\ b \end{bmatrix}_{base} = \begin{bmatrix} r_2 \\ g_2 \\ b_2 \end{bmatrix} \quad (64)$$

$$T_{S_{Case3}} = \begin{bmatrix} r \\ g \\ b \end{bmatrix}_{Case3} - \begin{bmatrix} r \\ g \\ b \end{bmatrix}_{base} = \begin{bmatrix} r_3 \\ g_3 \\ b_3 \end{bmatrix} \quad (65)$$

The scalars given in Eqs. 63-65 are used to create the set of linear equations as shown in Eq. 57, making it possible to solve for the relative channel-luminance ratios:

$$\frac{\hat{Y}_{red}}{\hat{Y}_{green}} \text{ and } \frac{\hat{Y}_{blue}}{\hat{Y}_{green}}. \quad (66)$$

These relative channel-luminance ratios are then combined with a C matrix, determined from a neutral identification process, as given in Eq. 10, to form a relative colorimetric mixing matrix (M) for the display.

In a further approach, the channel ratios are determined by flickering against a pure channel (e.g., green) and the heterochromatic flicker photometry includes a reference patch having a constant pure channel color and test stimulus have a constant predetermined base and adjustable pure channel colors. The flicker is minimized by adjusting the other pure channel colors to have the same luminance as the reference pure channel color In the first three approaches described above, three visual trials were performed to generate data necessary to solve for the channel-luminance ratios of the display. These channel-luminance ratios were used to develop a relative colorimetric mixing matrix for the display. In this approach, a process is generalized that can be used to solve for the channel-luminance ratios using two trials. In this case, a test stimulus (T2) having a given pure component (e.g., red) is flickered, for example, against a reference stimulus (T1) having a given pure component (e.g., green).

$$T_1 = T_{base} + T_{pure_{green}} = \begin{bmatrix} R \\ G \\ B \end{bmatrix}_{base} + \begin{bmatrix} 0 \\ G \\ 0 \end{bmatrix}_{pure} \quad (67)$$

$$T_{2_{red}} = T_{base} + T_{pure_{red}} = \begin{bmatrix} R \\ G \\ B \end{bmatrix}_{base} + \begin{bmatrix} R \\ 0 \\ 0 \end{bmatrix}_{pure} \quad (68)$$

Both T1 and $T_{2_{red}}$ have the same base stimulus. The reference stimulus (T1) has a constant amount of green stimulus. The test stimulus (T2) has an adjustable red component. The viewer adjusts the intensity of this component until the flicker is minimized using one of the stimulus presentation techniques given above.

In a second trial, the reference stimulus (T1) is flickered against a second test stimulus ($T_{2_{blue}}$) that has an adjustable blue component that is used to minimize the flicker given by:

$$T_{2_{blue}} = T_{base} + T_{pure_{blue}} = \begin{bmatrix} R \\ G \\ B \end{bmatrix}_{base} + \begin{bmatrix} 0 \\ 0 \\ B \end{bmatrix}_{pure} \quad (69)$$

The data resulting from this process are a set of digital counts that represent the amounts of pure red and blue stimuli needed to balance the luminance of a given green stimulus. These calorimetric channel scalar amounts are determined by converting T1, T2red, and T2blue into calorimetric channel scalars using a predetermined function (f), defined in Eq. 18, giving:

$$\begin{bmatrix} 0 \\ g \\ 0 \end{bmatrix}_{pure} = f(T_1) - f\left(\begin{bmatrix} R \\ G \\ B \end{bmatrix}_{base}\right) = \begin{bmatrix} r_{base} \\ g_{base} + g_{pure} \\ b_{base} \end{bmatrix} - \begin{bmatrix} r \\ g \\ b \end{bmatrix}_{base} \quad (70)$$

$$\begin{bmatrix} r \\ 0 \\ 0 \end{bmatrix}_{pure} = f(T_{2_{red}}) - f\left(\begin{bmatrix} R \\ G \\ B \end{bmatrix}_{base}\right) = \begin{bmatrix} r_{base} + r_{pure} \\ g_{base} \\ b_{base} \end{bmatrix} - \begin{bmatrix} r \\ g \\ b \end{bmatrix}_{base} \quad (71)$$

$$\begin{bmatrix} 0 \\ 0 \\ b \end{bmatrix}_{pure} = f(T_{2_{blue}}) - f\left(\begin{bmatrix} R \\ G \\ B \end{bmatrix}_{base}\right) = \begin{bmatrix} r_{base} \\ g_{base} \\ b_{base} + b_{pure} \end{bmatrix} - \begin{bmatrix} r \\ g \\ b \end{bmatrix}_{base} \quad (72)$$

Thus, the proportion of the pure green channel scalar to pure red channel scalar gives the Yred/Ygreen channel-luminance ratio directly.

$$\frac{Y_{red}}{Y_{green}} = \frac{g_{pure}}{r_{pure}} \quad (73)$$

Likewise, the proportion of the pure green channel scalar to the pure blue channel scalar gives the Yblue/Ygreen channel-luminance ratio directly.

$$\frac{Y_{blue}}{Y_{green}} = \frac{g_{pure}}{b_{pure}} \quad (74)$$

These relative channel luminance ratios are then used to determine the C matrix of the display. The C matrix is then combined with the channel luminance ratios, as shown in Eq. 10, to produce a relative colorimetric mixing matrix for the display. This approach uses the green channel as the reference stimulus, and the blue and the red channels as the test stimuli for the tests, but it will be understood that any of the pure channels could be used as the reference stimulus and the other pure channels could be used as the test stimuli. In such cases, the luminance ratios would be normalized relative to the pure channel used as the reference. The data used in this approach can be collected as shown and previously described with reference to FIG. 7.

The invention has been described in detail with particular reference to certain embodiments thereof, but it will be understood that variations and modifications can be effected within the spirit and scope of the invention.

PARTS LIST

| | |
|---|---|
| 10 | display patch |
| 10' | display patch |
| 12 | bipartite field |
| 12' | stimulus area |
| 14 | one half of field |
| 16 | other half of field |
| 18 | background |
| 18' | background |
| 20 | display step |
| 22 | oscillate field step |
| 24 | minimize flicker step |
| 26 | exit experiment |
| 28 | adjust step |
| 100 | display |
| 105 | background |
| 110 | candidate neutral color patch |
| 120 | candidate neutral color patch |
| 130 | candidate neutral color patch |
| 140 | candidate neutral color patch |
| 150 | candidate neutral color patch |
| 160 | candidate neutral color patch |

What is claimed is:

1. A method of characterizing a display having a plurality of color channels and unknown chromaticities of the color channels, the method implemented at least in part by a computer, and the method comprising the steps of:

a) visually characterizing the nonlinearities of the display;

b) visually determining luminance ratios of the color channels based at least upon input received from a user interface, heterochromatic photometry and the characterized nonlinearities;

c) visually determining the chromaticities of the color channels using a neutral identification process and the determined luminance ratios of the color channels;

d) calculating a colorimetric mixing matrix for the display, said calculating further comprising combining the luminance ratios of the color channels determined in step b with the chromaticities of the color channels determined in step c; and e) generating a characterization of colorimetric properties of the display using the colorimetric mixing matrix.

2. The method claimed in claim 1, wherein the heterochromatic photometry is heterochromatic brightness matching photometry.

3. The method claimed in claim 1, wherein the heterochromatic photometry is heterochromatic flicker photometry.

4. The method claimed in claim 3, wherein the heterochromatic flicker photometry includes a reference patch having a predefined color and test stimulus having adjustable pure channel colors and wherein the flicker is minimized by adjusting each pure channel color to have the same luminance as the reference color.

5. The method claimed in claim 3, wherein the heterochromatic flicker photometry includes a reference patch having a predefined color and test stimulus having a constant predetermined base and adjustable pure channel colors and wherein the flicker is minimized by adjusting each pure channel color to have the same luminance as the reference color.

6. The method claimed in claim 3, wherein the heterochromatic flicker photometry includes a reference patch having a predefined color and test stimulus having a constant predetermined base and adjustable mixed channel colors and wherein the flicker is minimized by adjusting each mixed channel color to have the same luminance as the reference color.

7. The method claimed in claim 3, wherein the heterochromatic flicker photometry includes a reference patch having a constant pure channel color and test stimulus having a constant predetermined base and adjustable pure channel colors and wherein the flicker is minimized by adjusting the other pure channel colors to have the same luminance as the reference pure channel color.

8. The method claimed in claim 3, wherein the process used to perform the heterochromatic photometry uses one of a direct binary search process and a method of adjustments process.

9. The method claimed in claim 1, wherein the process used to visually characterize the nonlinearity of the display comprises the steps of:

a1) visually characterizing an offset of the display;

a2) visually characterizing a gamma value of the display using a spatially or temporally dithered target; and a3) forming a display nonlinearity equation using the offset and gamma parameters obtained in steps a and b respectively.

10. The method claimed in claim 1, wherein the process used to visually characterize the nonlinearity of the display comprises the steps of:

a1) creating a plurality of temporally dithered patches;

a2) matching the luminance of the temporally dithered patches to the luminance of non-temporally varying patches; and a3) estimating the parameters of a display nonlinearity equation using a nonlinear optimization process.

11. The method of claim 1 wherein said characterization is an ICC profile.

12. The method of claim 1 wherein said generating further comprises using the characterized nonlinearities.

13. The method of claim 1 wherein said characterizing step and said determining steps each further comprise: displaying one or more patches to a user; accepting one or more inputs from the user providing an adjustment of said one or more patches; and using the adjustment; and at least one of said characterizing and determining steps further comprises modifying said displaying responsive to each of the respective said inputs.

14. A method of characterizing a display having a plurality of color channels and unknown chromaticities of the color channels, the method implemented at least in part by a computer and comprising the steps of:

visually characterizing the nonlinearities of the display;

visually determining, based at least upon input received from a user interface, luminance ratios of the color channels using heterochromatic flicker photometry and the characterized nonlinearities, said photometry including a reference patch having a predetermined color and a test stimulus having a plurality of channel colors, and wherein the flicker is minimized by adjusting said channel colors to have the same luminance as the reference color;

visually determining the chromaticities of the color channels using a neutral identification process and the determined luminance ratios of the color channels;

calculating a colorimetric mixing matrix for the display by combining said determined luminance ratios of the color channels and said determined chromaticities of the color channels; and generating a characterization of colorimetric properties of the display using the colorimetric mixing matrix.

15. The method of claim 14 wherein said test stimulus has a constant predetermined base.

16. The method of claim 15 wherein said test stimulus has one of adjustable pure channel colors and adjustable mixed channel colors.

17. The method of claim 14 wherein said test stimulus has adjustable pure channel colors.

18. The method of claim 14 wherein said photometry uses one of a binary search process and a method of adjustments process.

19. The method of claim 14 wherein said visually characterizing further comprises:

visually characterizing an offset of the display;

visually characterizing a gamma value of the display using a spatially or temporally dithered target; and forming a display nonlinearity equation using said offset and said gamma value.

20. The method of claim 14 wherein said visually characterizing further comprises:

creating a plurality of temporally dithered patches;

matching the luminance of the temporally dithered patches to the luminance of non-temporally varying patches; and estimating the parameters of a display nonlinearity equation using a nonlinear optimization process.

* * * * *